United States Patent [19]

Samuels

[11] 4,119,123
[45] Oct. 10, 1978

[54] FLEXIBLE HOSE WITH WEAR INDICATOR

[75] Inventor: Ernest K. Samuels, Brooklyn, N.Y.

[73] Assignee: Ernie Samuels, Inc., Brooklyn, N.Y.

[21] Appl. No.: 754,076

[22] Filed: Dec. 23, 1976

[51] Int. Cl.$^2$ ............... F16L 11/04; F16L 11/06; F16L 11/10

[52] U.S. Cl. ................. 138/122; 138/129; 138/154; 138/36

[58] Field of Search ............ 138/36, 103, 121, 122, 138/129, 154

[56] References Cited

U.S. PATENT DOCUMENTS

| | | | |
|---|---|---|---|
| 1,638,515 | 8/1927 | Walker | 138/154 |
| 1,975,832 | 10/1934 | Florez | 138/36 |
| 1,977,177 | 10/1934 | Florez | 138/36 |
| 2,707,492 | 5/1955 | Harris et al. | 138/122 |
| 2,739,089 | 3/1956 | Hageltorn | 138/129 X |
| 3,122,171 | 2/1964 | Britton et al. | 138/122 X |
| 3,255,780 | 6/1966 | Squirrell | 138/129 X |
| 3,495,628 | 2/1970 | Baender | 138/154 X |
| 3,605,817 | 9/1971 | Bauman et al. | 138/122 X |
| 3,679,531 | 7/1972 | Wienand et al. | 138/154 X |
| 3,919,026 | 11/1975 | Mizutani et al. | 138/122 X |
| 4,062,380 | 12/1977 | Hofle | 138/122 |

FOREIGN PATENT DOCUMENTS

| | | | |
|---|---|---|---|
| 61,124 | 11/1960 | Italy | 138/154 |
| 641,090 | 8/1950 | United Kingdom | 138/129 |
| 729,910 | 5/1955 | United Kingdom | 138/122 |
| 775,639 | 5/1957 | United Kingdom | 138/129 |

Primary Examiner—Richard E. Aegerter
Assistant Examiner—James E. Bryant, III
Attorney, Agent, or Firm—Darby & Darby

[57] ABSTRACT

A shaped elemental band is provided for forming a flexible hose with wear indicating means. The base of the band is formed by a strip of flexible material which has a pair of spaced marginal edges defining the width of the strip. On top of the strip and between the marginal edges, there is provided a rib which extends along the strip and protrudes substantially thereabove. A lower bonding surface is provided at the bottom of the strip, at least a portion of which surface extends under the area between the rib and a first of the marginal edges. An upper bonding surface is provided along the top of the strip, between the rib and the second marginal edge, and is shaped to conform substantially to the lower bonding surface when the band is wound into overlapping helical convolutions with the upper and lower bonding surfaces in intimate contact. To construct the hose, the band is wound into convolutions as explained and the upper and lower bonding surfaces are joined. With this construction, the strip forms the body of the resulting flexible hose, and the rib forms a helical ridge extending along the hose. The wear of the ridge serves as a reliable indication of hose wear. In the preferred embodiments, the rib is made hollow, so that when its interior becomes visible, the user is warned that the hose is worn and should be replaced.

22 Claims, 7 Drawing Figures

FLEXIBLE HOSE WITH WEAR INDICATOR

The present invention relates generally to flexible hoses and, more particularly, concerns an elemental band suitable for forming into adjacent helical convolutions for constructing such a hose.

Flexible hoses constructed of adjacent helical convolutions of an elemental band are well known in the prior art, as are bands of certain extruded shapes which are suitable for use in constructing such hoses. Elemental bands have been made of various conventional materials, including metals and plastics, and the hoses constructed from them have found broad applications in the cleaning of swimming pools, in industrial vacuum cleaners, and various other fields.

Prior art flexible hoses have often been used in environments where they have been subjected to abrasive wear on the outer surface of the hose. For example, when used for industrial and commercial vacuum cleaning, the hoses are often pulled across rough concrete floors. As a result, the hose outer surface is worn away and eventually becomes unserviceable due to leakage. A disadvantage of prior art hoses is that substantial wear, approaching the point of rupture, is not immediately obvious upon a cursory visual inspection of the hose. Consequently, the user of the hose is often surprised by a lack of serviceable hose, and is unexpectedly unable to use the associated equipment.

Broadly, it is an object of the present invention to indicate excessive wear on the surface of a hose in order to avoid unexpected ruptures. Specifically, it is within the contemplation of the present invention to provide a wear-indicating device on a hose, so that the degree of wear of the hose surface may be readily observed and determined.

It is another object of the present invention to provide an elemental band which can be formed into adjacent helical convolutions to construct a flexible hose including a discernible wear-indicating device.

It is another object of this invention to provide an elemental band of the type described which can be produced conveniently from a flexible material by conventional forming processes, such as by extrusion.

It is a further object of this invention to provide an elemental band of the type described which can be used to construct flexible hoses having a useful life which is longer than that of existing hoses of similar construction.

It is also an object of this invention to provide a flexible hose and an elemental band for constructing the hose which are convenient, reliable and efficient in use, yet relatively simple and inexpensive in construction.

In accordance with illustrative embodiments demonstrating objects and features of the present invention, there are provided several types of elemental bands for forming a flexible hose with wear-indicating means. The base of the band is formed by a strip of flexible material which has a pair of spaced marginal edges defining the width of the strip. On top of the strip and between the marginal edges, there is provided a rib which extends along the strip and protrudes substantially thereabove. A lower bonding surface is provided at the bottom of the strip, at least a portion of which surface extends under the area between the rib and a first of the marginal edges. An upper bonding surface is provided along the top of the strip, between the rib and the second marginal edge, and is formed to conform substantially to the lower bonding surface when the band is wound into overlapping helical convolutions with the upper and lower bonding surfaces in intimate contact. To construct the hose, the band is wound into convolutions as explained and the upper and lower bonding surfaces are joined. With this construction, the strip forms the body of the resulting flexible hose, and the rib forms a helical ridge extending along the hose. The wear of the resulting ridge serves as a reliable indication for wear of the hose. Inasmuch as the ridge can be worn smooth before any wear of the hose takes place, the useful life of the hose is also extended by providing the aforementioned ridge. In the illustrative embodiments the rib is made hollow so that a user is alerted to excessive hose wear when the interior of the rib becomes visible, but may continue to use the hose until the rib is worn smooth.

The foregoing brief description, as well as further objects, features and advantages of the present invention will be more completely understood by referring to the following detailed description of presently preferred, but nonetheless illustrative, embodiments in accordance with the present invention, with reference being had to the accompanying drawing, wherein.

Figure 1:
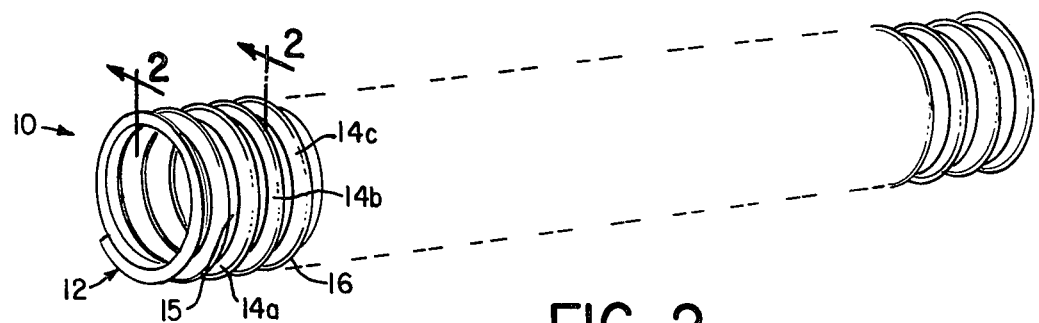
FIG. 1 is a perspective drawing showing a flexible hose embodying the present invention.

Referring now to the details of the drawing, and in particular to FIG. 1, there is shown a flexible hose, indicated generally by the numeral 10, which incorporates objects and features of the present invention. Hose 10 is formed from a flexible elemental band 12 by winding the band into overlapping lengthwise helical convolutions (for example, sequential convolutions 14a, 14b, 14c) and bonding adjacent convolutions, as is well known. In accordance with the invention, the hose 10 includes a helical ridge 16 which protrudes above the outer surface 15 of the hose and serves as a wear indicator. As will be explained more fully hereinafter, ridge 16 is also designed to extend the useful life of hose 10.

Figure 2:
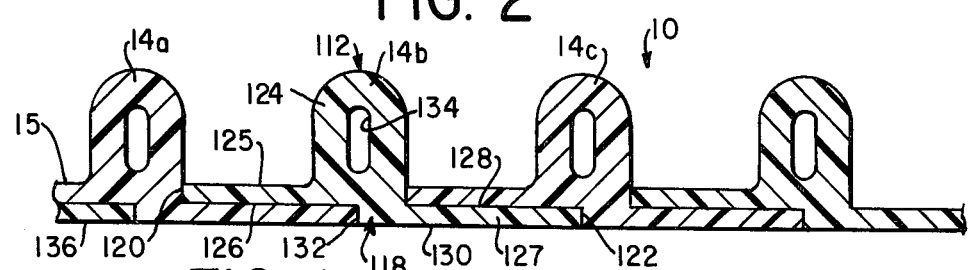
FIG. 2 is a fragmentary section view taken substantially along contour 2—2 and looking in the direction of the arrows in FIG. 1 to illustrate, in detail, how a preferred embodiment of the elemental band is formed into overlapping helical convolutions to construct a flexible hose.

Referring now to FIG. 2, there are shown, in cross-section, successive helical convolutions of a hose 10 constructed from a first embodiment 112 of the elemental band 12. The band 112 is conveniently made of any flexible material by conventional processes, but is preferably extruded from a flexible plastic material. Broadly, band 112 comprises a flexible base strip 118 having marginal edges 120, 122, which define the width of the strip, and a rib 124 secured on top of strip 118 to protrude upwardly between the edges 120, 122 and to extend along the strip 118. Underneath strip 118 and on a generally rectangular upper portion 125, there is provided a lower bonding surface 126 which extends under the area between edge 120 and rib 124. In the illustrative embodiment, surface 126 also extends under rib 124 to a point below the center of the rib. Between edge 122 and rib 124 and on a generally rectangular lower portion 127, there is provided an upper bonding surface 128 which is of the same width as lower bonding surface 126 and is shaped to conform thereto when the band 112 is wound into overlapping helical convolutions to form the hose 10. In the embodiment of FIG. 2, this is achieved by forming surfaces 126 and 128 so that they lie generally in a common horizontal plane (i.e., they will lie on a common cylindrical surface when the hose is formed). Strip 118 also includes a horizontal bottom wall 130 which is bounded by edge 122 and an edge 132 which lies in a plane parallel to edge 122.

Rib 124 is conveniently formed on band 112 at the same time as and integrally with strip 118. In the illustrative embodiment, rib 124 includes an internal channel 134 of closed cross-section extending therealong, so that the rib 124 is hollow. It will be appreciated, however, that rib 124 could equally well be made solid. A hollow rib may be provided here, among other reasons, to save on material, and also as a wear-indicator as described below. It will also be appreciated that band 112 could include more than one rib. For example, a plurality of parallel ribs could be provided along strip 118 between edges 120 and 122.

In constructing the flexible hose 10, band 112 is wound into overlapping lengthwise helical convolutions in each of which lower bonding surface 126 engages upper bonding surface 128 of an adjacent convolution and edge 132 of each convolution engages edge 122 of the adjacent convolution. With the band 112 wound in this manner, hose 10 is formed by bonding the surfaces 126, 128 and optionally also the edges 122, 132. Inasmuch as the surfaces 126 and 128 lie in a common plane, adjacent convolutions of bottom wall 130 are always aligned where they abut (i.e., at the union of the edges 122 and 132). Consequently, these adjacent convolutions cooperate to form a substantially smooth cylindrical surface 136 which constitutes the inner surface of hose 10.

Figure 3:
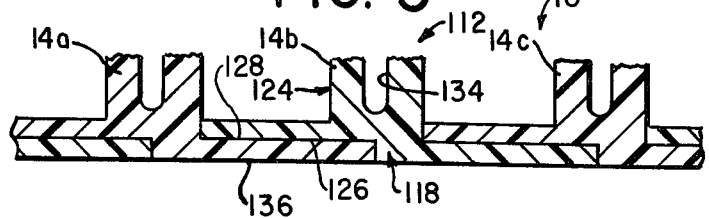
FIG. 3 is a fragmentary sectional view, similar to FIG. 2, and illustrates the hose after substantial wear of the helical ridge has taken place.

Referring now to FIG. 3, there is shown a hose of the same type illustrated in FIG. 2, which hose has been subjected to a considerable amount of wear. It will be observed that, on this hose, the top of the rib 124 has been worn away on successive convolutions of band 112, so that the interior of the rib is visible. Clearly, the amount of wear exhibited by rib 124 serves as an indication of the amount of wear experienced by the hose and provides advance warning of hose ruptures. The visibility of the two worn edges of rib 124 (in FIG. 3) indicates a substantial amount of wear. However, rib 124 may wear completely smooth before the hose surface 15 itself experiences any wear. Consequently, it will be appreciated that hoses having the disclosed rib structure will have a substantially longer useful life than prior art hoses, on which the outer surface begins to wear immediately. Where a solid rib is provided instead of a hollow one, the portion of the rib corresponding to channel 134 could be made of a material of a different color than the remainder of the rib, so that wear will be more noticeable.

Alternate embodiments of the invention are shown in FIGS. 4, 5, 6 and 7, and are nearly identical to the embodiment shown in FIG. 2. The major distinction is that, in the embodiment of FIG. 2, the hose 10 had a substantially smooth and continuous inner surface 15, whereas in the alternate embodiments the inner surface of the hose includes a helical groove the sides of which are separated and compressed as the hose is flexed, so that hose flexibility is increased.

Figure 4:
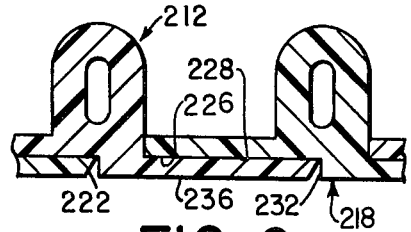
FIGS. 4–7 are fragmentary sectional views similar to FIG. 2 illustrating alternate embodiments for the elemental band and the structure of a hose constructed from them.
Figure 5:
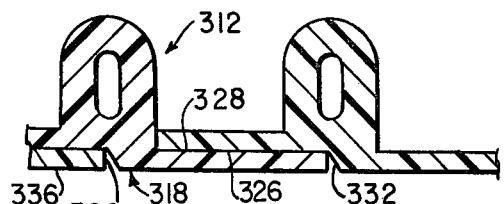
Figure 6:
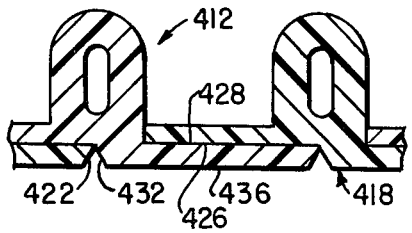

In FIGS. 4, 5 and 6, the upper and lower bonding surfaces, corresponding to surfaces 126 and 128 of FIG. 2, respectively, are of the same width, but the edges corresponding to edges 122 and 132 of FIG. 2 lie in planes which intersect above the bottom wall so that there is a gap between them when the hose is formed. As a result, a groove having a generally triangular cross-section is formed in the inside wall of the hose. In FIG. 4, edge 232, which corresponds to edge 132 of FIG. 2, is generally perpendicular to bottom wall 236, and edge 222, which corresponds to edge 122 of FIG. 2, is generally inclined to form a wedge-shaped groove in wall 236. Similarly, a wedge-shaped groove is formed in wall 336 of FIG. 5 as a result of generally perpendicular wall 322 and inclined wall 332. In FIG. 6, walls 422 and 432 are both inclined, so that a groove having a generally triangular cross-section is formed in wall 336.

Figure 7:
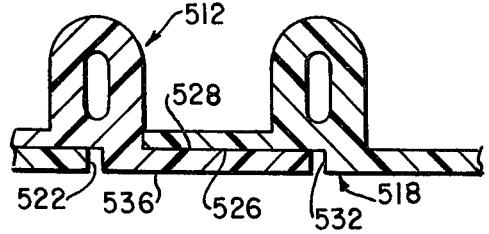

In FIG. 7, lower bonding surface 526, which corresponds to surface 126 of FIG. 2, is wider than upper bonding surface 528, which corresponds to surface 128 of FIG. 2. Consequently, there is a gap between the edges 522 and 532, so that a generally rectangular groove is formed in wall 536.

It will be appreciated that the edges forming the groove in the inside wall of the hose need not be planar, but could, for example, be curved (in cross-section) and flared outwardly to form the aforementioned groove. In all respects, other than those specifcally described above, the hoses formed with the specific band embodiments 212, 312, 412 and 512 illustrated in FIGS. 4, 5, 6 and 7, respectively, are identical to the hose formed with elemental band 112 of FIG. 2.

Although specific embodiments of the invention have been disclosed for illustrative purposes, it will be appreciated by those skilled in the art that many additions, modifications and substitutions are possible without departing from the scope and spirit of the invention as defined in the accompanying claims. For example, it will be appreciated that, although the upper and lower bonding surfaces (e.g., 126 and 128 in FIG. 2) have been shown as lying in a common horizontal plane, they may, in fact, lie in different but parallel planes. The surfaces 126, 128 could, for example, lie in parallel inclined planes, so that strip 118 would be very thin at the edges 120, 122 and would grow wider towards the rib 124. It will also be appreciated that, although the upper and lower bonding surfaces have been shown, in the illustrative embodiments, as planar, they could, as a practical matter, have any shape as long as they conform substantially so that they may be bonded together and any space between them may be filled with a conventional sealant.

What is claimed is:

1. An elemental band for use in constructing a flexible hose comprising:
   a strip of flexible material having first and second marginal edges defining the width of said strip;
   at least one rib secured on top of said strip to protrude thereabove and to extend therealong between and in spaced relationship from said edges;
   a lower bonding surface extending along the underside of said strip, at least a portion of said lower bonding surface extending under the area between said rib and said first edge; and
   an upper bonding surface extending along the top of said strip between said rib and said second edge, said upper bonding surface lying substantially in a common plane with said lower bonding surface and said second edge being further from said rib than said first edge, said strip being formable into overlapping helical confolutions with said upper and lower bonding surfaces in confronting relationship, with the first edge of each convolution abutting said rib in a first adjacent convolution of said band, and with said upper bonding surface conforming generally to said lower bonding surface and, in each convolution, extending under said rib in a second adjacent convolution of said band;

said strip being formable into a hose by bonding said upper and lower bonding surfaces in said confronting relationship, said rib being adapted to form a helical ridge useful as a wear indicator on the surface of said hose.

2. The elemental band of claim 1 wherein said rib includes therein an internal channel of closed cross-section so that said rib is hollow, substantial wear of said hose being indicated when the interior of said rib becomes visible.

3. An elemental band in accordance with claim 1 wherein said strip includes a bottom wall parallel to said common plane and disposed therebelow, said bottom wall being constructed and arranged so that adjacent helical convolutions thereof cooperatively form a substantially continuous, cylindrical inside wall for said hose.

4. The elemental band of claim 3 wherein said upper and lower bonding surfaces extend equal distances across the width of said strip.

5. The elemental band of claim 4 wherein said strip further includes a third edge disposed below said lower bonding surface, at least one of said second and third edges being shaped to flare outwardly so that said second and third edges cooperatively define a helical groove in said hose inside wall when said hose is formed.

6. The elemental band of claim 4 wherein said strip further includes a third edge disposed below said lower bonding surface and lying in a plane parallel to said second edge, said bottom wall being bounded by said second and third edges.

7. The elemental band of claim 4 wherein said strip further includes a third edge disposed below said lower bonding surface, said second and third edges bounding said bottom wall and lying in different planes, which planes intersect above said bottom wall so that a helical groove of triangular cross-section is formed in said hose inside wall when said hose is formed.

8. An elemental band for use in constructing a flexible hose comprising:
a strip of flexible material having first and second marginal edges defining the width of said strip;
at least one rib secured on top of said strip to protrude thereabove and to extend therealong between said edges;
a lower bonding surface extending along the underside of said strip, at least a portion of said lower bonding surface extending under the area between said rib and said first edge; and
an upper bonding surface extending along the top of said strip between said rib and said second edge, said upper bonding surface lying substantially in a common plane with said lower bonding surface and being constructed and arranged to conform generally to said lower bonding surface when said strip is wound into overlapping helical convolutions with said upper and lower bonding surfaces in confronting relationship, said upper bonding surface being further constructed and arranged to extend under said rib in an adjacent convolution of said band, said strip being formable into a hose by bonding said upper and lower bonding surfaces in said confronting relationship, said rib being adapted to form a helical ridge useful as a wear indicator on the surface of said hose;

said strip including a bottom wall parallel to said common plane and disposed therebelow, said bottom wall being constructed and arranged so that adjacent helical convolutions thereof cooperatively form a substantially continuous, cylindrical inside wall for said hose;

said lower bonding surface extending for a greater distance across the width of said strip than said upper bonding surface, so that there is a gap between said second and third edges when said hose is formed, said gap defining a helical groove in said hose inside wall.

9. A hose of the type constucted by joining overlapping helical convolutions of a flexible elemental band, said hose comprising:
a strip of flexible material having first and second marginal edges defining the width of said strip, said strip forming a base for said elemental band;
at least one rib secured on top of said strip to protrude thereabove and to extend therealong between and in spaced relationship from said edges;
a lower bonding surface extending along the underside of said strip, at least a portion of said lower bonding surface extending under the area between said rib and said first edge, said lower bonding surface lying in a common plane with said upper bonding surface when said hose is viewed in lengthwise cross-section; and
an upper bonding surface extending along the top of said strip between said rib and said second edge, said upper bonding surface conforming generally to said lower bonding surface and being bonded in confronting relationship therewith and extending under said rib in an adjacent convolution of said band, said rib forming a helical ridge useful as a wear indicator on the surface of said hose.

10. The hose of claim 9 wherein said rib includes therein an internal channel of closed cross-section so that said rib is hollow, substantial wear of said hose being indicated when the interior of said rib becomes visible.

11. A hose in accordance with claim 9 wherein said strip includes a bottom wall parallel to said common cylindrical surface and disposed therebelow, said bottom wall being constructed and arranged so that adjacent helical convolutions thereof cooperatively form a substantially continuous, cylindrical inside wall for said hose.

12. The hose of claim 11 wherein said upper and lower bonding surfaces extend equal distances across the width of said strip.

13. The hose of claim 12 wherein said strip further includes a third edge disposed below said lower bonding surface and being parallel to said second edge, said bottom wall being bounded by said second and third edges.

14. A hose of the type constructed by joining overlapping helical convolutions of a flexible elemental band, said hose comprising:

a strip of flexible material having first and second marginal edges defining the width of said strip, said strip forming a base for said elemental band;

at least one rib secured on top of said strip to protrude thereabove and to extend therealong between said edges;

a lower bonding surface extending along the underside of said strip, at least a portion of said lower bonding surface extending under the area between said rib and said first edge;

an upper bonding surface extending along the top of said strip between said rib and said second edge, said upper bonding surface being constructed and arranged to conform generally to said lower bonding surface and being bonded in confronting relationship therewith, said rib forming a helical ridge useful as a wear indicator on the surface of said hose;

said upper and lower bonding surfaces extending equal distances across the width of said strip; and said strip further including a third edge disposed below said lower bonding surface, at least one of said second and third edges being shaped to flare outwardly, said second and third edges cooperatively defining a helical groove in said hose inside wall.

15. A hose of the type constructed by joining overlapping helical convolutions of a flexible elemental band, said hose comprising:

a strip of flexible material having first and second marginal edges defining the width of said strip, said strip forming a base for said elemental band;

at least one rib secured on top of said strip to protrude thereabove and to extend therealong between said edges;

a lower bonding surface extending along the underside of said strip, at least a portion of said lower bonding surface extending under the area between said rib and said first edge;

an upper bonding surface extending along the top of said strip between said rib and said second edge, said upper bonding surface being constructed and arranged to conform generally to said lower bonding surface and being bonded in confronting relationship therewith, said rib forming a helical ridge useful as a wear indicator on the surface of said hose;

said upper and lower bonding surfaces extending equal distances across the width of said strip; and said strip further including a third edge disposed below said lower bonding surface, said second and third edges bounding said bottom wall and lying substantially in different planes, which planes intersect above said bottom wall, so that a helical groove of triangular cross-section is formed in said hose inside wall.

16. A hose of the type constructed by joining overlapping helical convolutions of a flexible elemental band, said hose comprising:

a strip of flexible material having first and second marginal edges defining the width of said strip, said strip forming a base for said elemental band;

at least one rib secured on top of said strip to protrude thereabove and to extend therealong between said edges;

a lower bonding surface extending along the underside of said strip, at least a portion of said lower bonding surface extending under the area between said rib and said first edge;

an upper bonding surface extending along the top of said strip between said rib and said second edge, said upper bonding surface being constructed and arranged to conform generally to said lower bonding surface and being bonded in confronting relationship therewith, said rib forming a helical ridge useful as a wear indicator on the surface of said hose; and said lower bonding surface extending for a greater distance across the width of said strip than said upper bonding surface, so that there is a gap, between said second and third edges, defining a helical groove in said hose inside wall.

17. A flexible band for use in constructing a hose of the type consisting of helical convolutions, comprising in cross-section:

a. a generally rectangular lower portion having
   (i) a first bonding surface,
   (ii) a bottom wall parallel to the first bonding surface,
   (iii) an outer edge connecting the first bonding surface and the bottom wall,
   (iv) an overlap portion extending beyond the first bonding surface, and
   (v) an inner edge connecting the overlap portion to the bottom wall;

b. a generally rectangular upper portion having
   (i) a second bonding surface substantially coplanar with and at least coextensive with the first bonding surface,
   (ii) an overlap portion extending beyond the second bonding surface,
   (iii) an upper wall parallel to the second bonding surface,
   (iv) the overlap portion of the lower element overlapping and being fixed to the overlap portion of the upper element; and c. a hollow projecting rib fixed to the upper wall and extending in a direction substantially perpendicular to the first and second bonding surface,
   the first bonding surface facing towards the hollow projecting rib, said strip being formable into overlapping helical convolutions with said first bonding surface extending under said rib in an adjacent convolution and bonded with the second bonding surface to form the band into a hose,
   the second bonding surface facing away from the hollow projecting rib.

18. The elemental band of claim 17 wherein said first and second bonding surfaces extend equal distances across the width of said band.

19. The flexible band of claim 18 wherein at least one of said inner and outer edges is shaped to flare outwardly so that said inner and outer edges cooperatively define a helical groove in the inside wall of a hose formed from said band.

20. The flexible band of claim 18 wherein said inner edge lies in a plane parallel to said outer edge.

21. The flexible band of claim 18 wherein said inner and outer edges lie in different planes, which planes intersect above said bottom wall so that a helical groove of triangular cross-section is formed in the inside wall of a hose formed from said band.

22. The elemental band of claim 17 wherein said second bonding surface extends for a greater distance across the width of said strip than said first bonding surface, so that there is a gap between the inner and outer edges of adjacent convolutions when a hose is formed from said band, said gap defining a helical groove in said hose inside wall.

* * * * *